US00RE36412E

United States Patent [19]

Jones

[11] E Patent Number: Re. 36,412

[45] Reissued Date of Patent: Nov. 30, 1999

[54] ARTICLE PACKAGING KIT, SYSTEM AND METHOD

[76] Inventor: W. Charles Jones, 3 Ida La., East Sandwich, Mass. 02537

[21] Appl. No.: 08/665,433

[22] Filed: Jun. 18, 1996

Related U.S. Patent Documents

Reissue of:

[64] Patent No.: 5,323,896
Issued: Jun. 28, 1994
Appl. No.: 08/082,258
Filed: Jun. 24, 1993

[51] Int. Cl.[6] ..... B65D 69/00; B65D 71/00; B65D 81/02; B65B 11/00

[52] U.S. Cl. ..... 206/223; 206/583; 206/591; 206/495; 53/462; 53/207; 53/449; 53/170

[58] Field of Search ..... 206/223, 225, 206/38, 216, 583, 591, 592, 495, 497; 53/462, 207, 449, 174, 170

[56] References Cited

U.S. PATENT DOCUMENTS

| | | | |
|---|---|---|---|
| 1,936,951 | 11/1933 | Peterson . | |
| 2,031,381 | 2/1936 | McCallum | 206/223 |
| 2,707,553 | 5/1955 | Yount . | |
| 2,802,565 | 8/1957 | Kabbash . | |
| 2,919,797 | 1/1960 | McCracken . | |
| 3,089,590 | 5/1963 | Mell . | |
| 3,424,306 | 1/1969 | Munck . | |
| 3,507,383 | 4/1970 | Rorer . | |
| 3,540,579 | 11/1970 | Hellstrom . | |
| 3,669,337 | 6/1972 | Struble . | |
| 3,718,275 | 2/1973 | Willinger . | |
| 3,891,090 | 6/1975 | Spiegel . | |
| 3,905,474 | 9/1975 | Haibara . | |
| 3,966,046 | 6/1976 | Deutschländer | 206/495 |
| 4,030,603 | 6/1977 | Angell . | |
| 4,306,653 | 12/1981 | Fales | 206/497 |
| 4,307,804 | 12/1981 | Benham | 206/497 |
| 4,494,689 | 1/1985 | Ilitch . | |
| 4,757,900 | 7/1988 | Misset et al. | 206/497 |
| 5,086,925 | 2/1992 | Coalier et al. . | |
| 5,325,967 | 7/1994 | Gonzales . | |
| 5,388,701 | 2/1995 | Ridgeway . | |

FOREIGN PATENT DOCUMENTS

| | | |
|---|---|---|
| 691904 | 8/1964 | Canada . |
| 49-59982 | of 1974 | Japan . |
| 49-77087 | 9/1974 | Japan . |
| 50-88376 | 7/1975 | Japan . |
| 50-102778 | 8/1975 | Japan . |
| 50-107583 | 9/1975 | Japan . |
| 57-177969 | 11/1982 | Japan . |
| 3100158 | 10/1991 | Japan . |
| 1266593 | 3/1972 | United Kingdom . |

*Primary Examiner*—M. D. Patterson
*Attorney, Agent, or Firm*—Aufrichtig Stein & Aufrichtig, P.C.

[57] ABSTRACT

An article packaging kit, system and method which system includes a flat, corrugated, cardboard sheet material having a central horizontal fold line and two vertical fold lines to define a base and two end portion. The system includes a flexible plastic sleeve or tube which loosely fits about a portion of the base of the sheet material in the flat condition. The sheet material moves between a horizontal line folded position when an article to be packaged is inserted within the sleeve and a flat, article hugging, immobilizing position when the end portions are folded upwardly causing the base portion to become flat. The system includes optionally inserting the immobilized article on the folded sheet material into a packaging or shipping container.

51 Claims, 4 Drawing Sheets

ARTICLE PACKAGING KIT, SYSTEM AND METHOD

Matter enclosed in heavy brackets [ ] appears in the original patent but forms no part of this reissue specification; matter printed in italics indicates the additions made by reissue.

*This is a Reissue of application Ser. No. 08/082,258, U.S. Pat. No. 5,323,896.*

BACKGROUND OF THE INVENTION

There are a wide variety of packaging kit systems and methods for the immobilization and packaging of articles, particularly fragile, odd-shaped articles. The various methods include, but are not limited to, the employment of a corrugated picture frame with a plastic film laminated to it and with two frames closed over the articles to be packaged and suspending the article between the two frames with the laminated film. Other techniques include foam in place polyurethane, wherein the liquid urethane components are dispensed and foamed up to form a cocoon of urethane formed snugly about the article, which article is protected from the expandable foam by the employment of a separate film. Another technique includes a loose, filled, foldable, foam-type material, such as, but not limited to, expanded polystyrene shapes which are poured above an article to be protected in an outer container, with various interlocking shapes of expandable polystyrene commonly available. A further technique for protecting articles to be packaged include the use of fabricated foam techniques wherein foam is die cut, saw cut, or hot-wired cut to form end caps or trays to contain the article. Such foams would include the polyethylene, polystyrene, or polyurethane foams which are adapted to be in cuts or grooves in particular shapes to protect the article. Also available for the protection of articles are foam or bubble wraps which have flexible foam sheets with a plurality of air-formed bubbles, or foam sheets which are wrapped about an article to be secured by die cut, corrugated cardboard is often used, where the corrugated cardboard is die cut and then folded in a particular shape to form a cap or tray to contain the article to be immobilized and shipped, and further, molded pulp trays or caps are employed which are molded from pulp or from the use of recycled paper.

While all of these packaging kit systems or methods have various advantages, it is desired to provide for a new, easy, effective, recyclable and improved packaging kit, system and method for the immobilization, particularly of fragile odd-shaped articles, and for placing the immobilized article within an outer container, and which kit, system and method overcomes some of the disadvantages of the prior art and further offer new and additional advantages.

SUMMARY OF THE INVENTION

The invention relates to a packaging kit, system and method for the immobilizing of an article for use with an outer container. In particular, the invention is directed to a packaging kit, system and method for the immobilization particularly of odd-shaped, fragile articles to be placed within an outer container, which kit, system and method provides environmental advantages, simplicity and ease in manufacture and use.

The invention comprises a packaging kit for the immobilization of an article to be packaged within a separate outer container. The kit comprises a stiff sheet material, such as, for example, but not limited to, a paper or corrugated cardboard sheet material of defined width and length, and which sheet material has a base portion generally dimensioned to hold the article to be immobilized, and end portions which may be the same or different length of the base portion on opposite sides of the base portion and which end portions are adapted to be folded generally perpendicularly upwardly from the base portion and at either end of the base portion. The base portion with the immobilize article in the upward end portions is adapted to be inserted in an outer container for packaging and shipping. The sheet material has a horizontal fold line, typically a centrally disposed fold line, which generally extends substantially along its length, but which may include more than one fold line to permit the sheet material to move between a first, generally flat, position and a second, foldable article insertion position. The sheet material includes first and second spaced-apart, generally substantially parallel, vertical fold lines to define the end portions and to permit the end portions to move between a generally planar flat position and a upwardly folded position when the article is immobilized.

The invention also includes a film tube or sleeve means, typically dimensioned and adapted to be positioned and loosely fit, such as slidably, about the sheet material and particularly the base portion thereof, in a generally loose-type fit when the sheet material is in a non-use position, to fit closely in a huggable type manner about the article on the base portion in the article immobilization position. The kit permits the article to be immobilized to be inserted between the base portion and the interior of the tube or squeeze means when the sheet material is in the folded article-insertion position for the positioning of the article in the base portion, and then when the end portions are folded upwardly the sheet material is returned to a generally flat planar position by the upward movement of the end portions, and which movement then immobilizes the article on the base portion, by causing the tube or sleeve means to stretch over the article or articles being immobilized to hold the article or articles in place on the base portion in a close, tight, huggable, article-immobilizing fashion. The upward movement of the end portions on the vertical fold lines causes the horizontal fold line to flatten out on the sheet material, which in turn causes the sleeve or tube to stretch over the article being packaged and to be immobilized in place. Typically and optionally, the kit of the invention may include an outer container of defined dimension, but typically having a base of similar dimension as the base portion in which the immobilized article with the sheet material may be inserted.

The invention includes a method for the immobilization of one or more articles of packaging within an outer container, which method comprises providing a structurally stiff sheet material, having at least one horizontal fold line and vertical fold lines to define a base portion and end portions and a tube or sleeve means. The method includes placing the film tube means above the sheet material, for example, by sliding the film tube means over the sheet material and positioning over the base portion of the sheet material, and then folding the sheet material along the horizontal fold lines, to place the sheet material in an article insertion position and to permit the film tube means over the base portion to blouse outwardly from the base portion of the sheet material. The method includes inserting one or more of the articles between the base portion and the interior of the bloused-out film tube means over the base portion and then folding the end portions of the sheet material upwardly, such as generally perpendicularly from the plane of the base on the first and second vertical fold lines in order to place the sheet material in a generally flat position and to cause the film tube means to move inwardly against the inserted articles and to stretch and to hug and thereby immobilize the article on the base portion of the sheet material.

The present invention offers many and substantial advantages over prior at packaging kits systems and methods, for example, and not to be limited to, the employment of minimum pre-use storage space since the items, that is the sheet material and the film tube means may be stored together or separately in a flat condition for high density storage. The invention permits a universal application, since the film tube means may be adapted to stretch over one or more of a variety of articles to be packaged and pack a variety of different articles of regular or odd shapes, reducing substantially the inventory of packaging materials required where there are a number of articles to be packaged. The kit, system and method of the present invention is environmentally acceptable and sound and can be made, if required, of recyclable film such as, for example, recycled polyethylene or other flexible plastic film and corrugated or paper-type material such as reusable corrugated cardboard.

The inventive kit and system is reusable and can be knocked down easily and the immobilized article removed by placing the sheet material in an article insertion or open position and then removing the article from the sheet and therefore the film tube means or the sheet material may be taken used for later re-use. The present system is clean and easy to use and does not present the disadvantages as employed with loose tubes, foam-type material and foam in place packaging systems, and does not present any disposable problems, as the components may be made of low-cost, easily disposed of, recyclable components. The present invention film tube means is not secured to a sheet material such as a corrugated board and therefore the film tube and the sheet material may be easily recycled without separation, while the present kit system and method provides a combination of various films of plastic film, non-plastic film, foam films, or air bubble plastic films with various sheet materials to be used, and therefore allows for a wide range of applications of sheet and tube materials to the kit, system and method.

The sheet material useful in the kit and system may be any type of relatively stiff or stiff sheet-type material, and is particularly adapted for use with a paper or corrugated cardboard-type material wherein the one or more horizontal and two or more vertical fold lines may be easily imparted to the sheet material, for example, through a prescoring technique to permit the easy folding of the sheet material or the end portions along the fold lines. The sheet material may have any dimension, but typically has an elongated rectangular shape and generally with each of the end portions in one embodiment having the same length and width as the base portion. While the sheet material is shown for the purpose of illustration only with a central horizontal fold line, it is recognized that more than one horizontal fold line may be employed, and that additional vertical fold lines could be added to permit the immobilized article in the sheet material to be suspended from the outer container walls, or to permit the outer portions of the end portions of the sheet material to be folded over further over the top of the immobilized article so that the sheet material surrounds the article.

The film tube or sleeve means employed with the stiff sheet material to form the kit of the invention can be selected from a wide variety of material, but generally is comprised of paper, foam or other material in sleeve or tube form which may be employed and preferably is slightly stretchable or article form fitting, so that it may hug and immobilize the article on the base portion of the sheet material. Such material typically would include, but not be limited to, a wide variety of flexible, slightly stretchable, tear-resistant plastic film-type materials, such as, for example, olefinic, vinyl and urethane-type films more particularly with the polyethylene or recycled polyethylene-type film formed into a single sleeve or tube. The film thickness may vary as desired, and generally, for example, may range from one to ten or more mils, and generally should be selected to be slightly stretchable, tear-resistant, and low slip, so it may be slidably and easily placed over the base portion, and should be a clingable-type material, so that with the use of odd-shaped articles, such as, for example, a coffee or tea cup, it may stretch and cling to the outside surface of the article to immobilize the article.

In one embodiment, it is desirable to have the film tube or sleeve means of a transparent plastic material, so that the immobilized article may be visually observed. The film tube or sheet material may of course be comprised of a stretchable foam-type or air bubble type material formed in a sleeve or tube means. Generally, the film or sleeve tube means would be cut to a length such that it fits over a sufficient portion of the article to immobilize the article, generally over or about the entire length of the article, and generally but not necessarily extends the length of the base portion of the sheet material. However, the film tube or sleeve means may also be extended so that it extends slightly over the ends of the base portion onto and over the vertical first and second fold lines and into the end portions, for example, a half-to two or three inches, so that when the end portions are folded upwardly the flexible film tube or sleeve means are folded inwardly to form a layer against the lower portion of each of the end portions, and therefore to more securably retain the article in an immobilized position.

The kit optionally would include the outer container in which the immobilized article on the sheet material may be inserted and then be contained, sealed and shipped. Additional dunnage or other packaging material may be inserted on top of or about the immobilized article for further protection as required, or the end portions may be further folded over along additional vertical fold lines to encompass and extend over the top of the Mobilized article prior to placing the immobilized article on the sheet material within the outer container. The method of the invention is particularly useful wherein one or more odd-shaped fragile type articles need to be securely immobilized for package and shipment, such as electronic components, dinnerware, such as plates, cups or other types of fragile, delicate, odd-shaped articles.

The invention will be described for the purposes of illustration only in connection with certain preferred embodiments; however, it is recognized that those persons skilled in the art may make various, modifications, changes, improvements and additions to the illustrated embodiments without departing form the spirit and scope of the invention.

DESCRIPTION OF THE EMBODIMENTS

Figure 1:
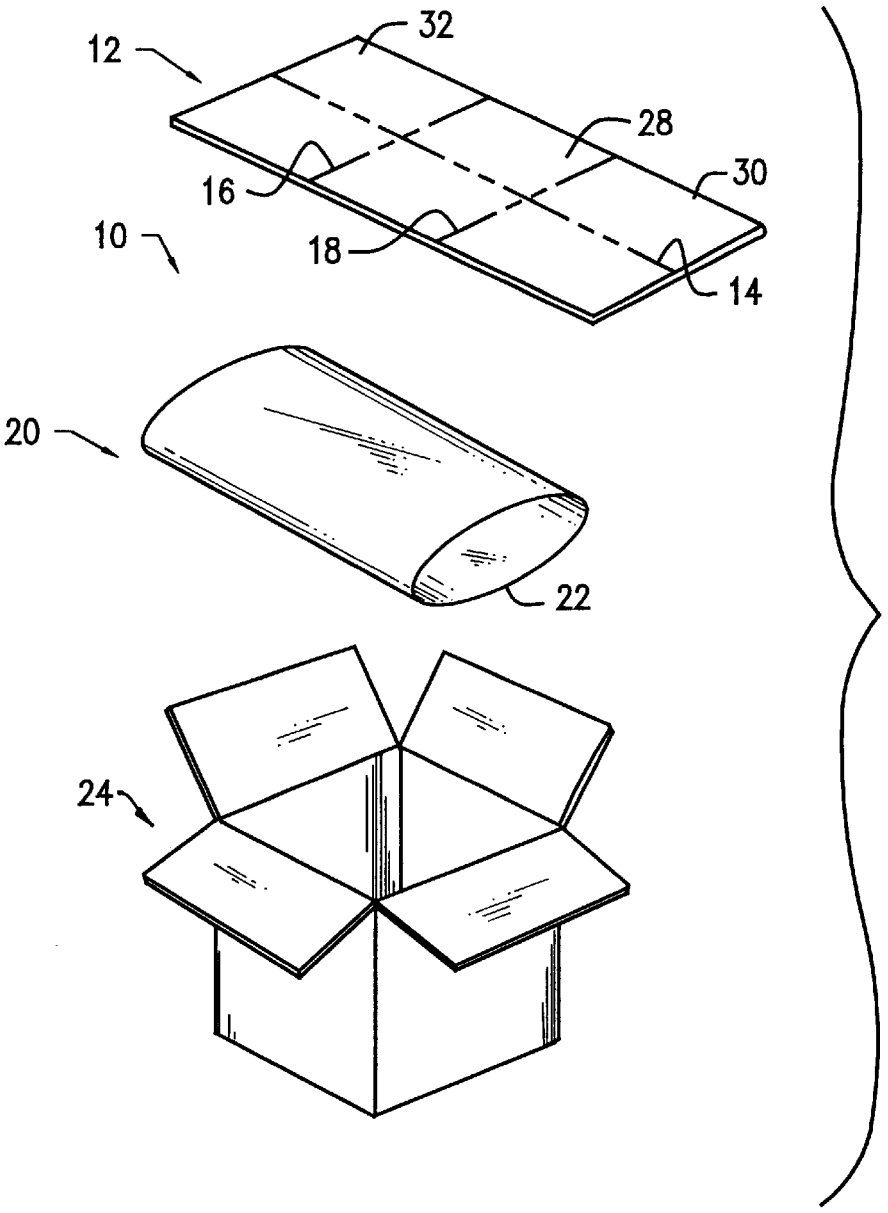
FIG. 1 is an exploded view of the components of the packaging kit of the invention.

FIG. 1 is an exploded perspective view of the packaging kit 10 of the invention that shows a stiff sheet material 12 typically of a corrugated cardboard, having a width and length, with the length generally three times the width and haven a central fold line, typically a pre-scored fold line 14 extending from one to the other end of the length and centrally of the sheet material 12 and having two perpendicular vertical fold lines 16 and 18 extending across the sheet material 12 of one length and typically pre-scored, the pre-scored fold lines 14, 16 and 18 scored sufficiently to permit easy folding of the sheet material 12 and therefore dividing the sheet material into a base section 28 and two end portions adjacent thereto 30 and 32. The kit 10 also includes a sleeve or tube 20 having an open end 22 at each end and typically composed of a transparent, flexible, stretchable, tear-resistant material, such as, for example, recycled polyethylene, generally of about 2–5 mils in thickness. The sleeve or tube 12 is of sufficient dimensions to fit in a flat condition loosely and slidably over the width of the sheet material 12, as illustrated, not too tightly. The kit 10 also includes optionally a container 24 for the insertion of the immobilized article on the base sheet 12 by the stretching of the sleeve 20 which is a cardboard box dimensioned to receive the folded up sheet material 12.

Figure 2:
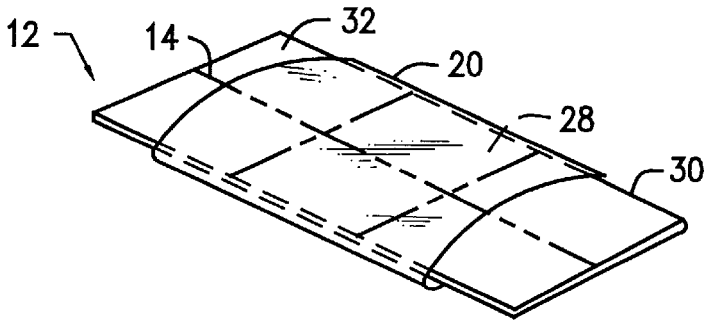
FIG. 2 is perspective view of two of the components of FIG. 1 in a position.

FIG. 2 is a perspective view of the sheet material 12 and of the tube or sleeve 20 with the tube or sleeve positioned over the base portion 28 of the sheet material 12 and shown as extending slightly over the edge of each of the end portions 30 and 32, for example, of About ½ to 2 inches. As illustrated, the tube or sleeve 20 is shown in Position in FIG. 2 as slightly outwardly in the flat condition for the outer edges of the sheet material 20. The components 12 and 20 may be flatly stored separately or stored and shipped in convenient, compact form as illustrated in FIG. 2 for insertion of an article to be immobilized. The position shown in FIG. 2 its the flat, non-use position of the sheet material 12 and tube 20.

Figure 3:
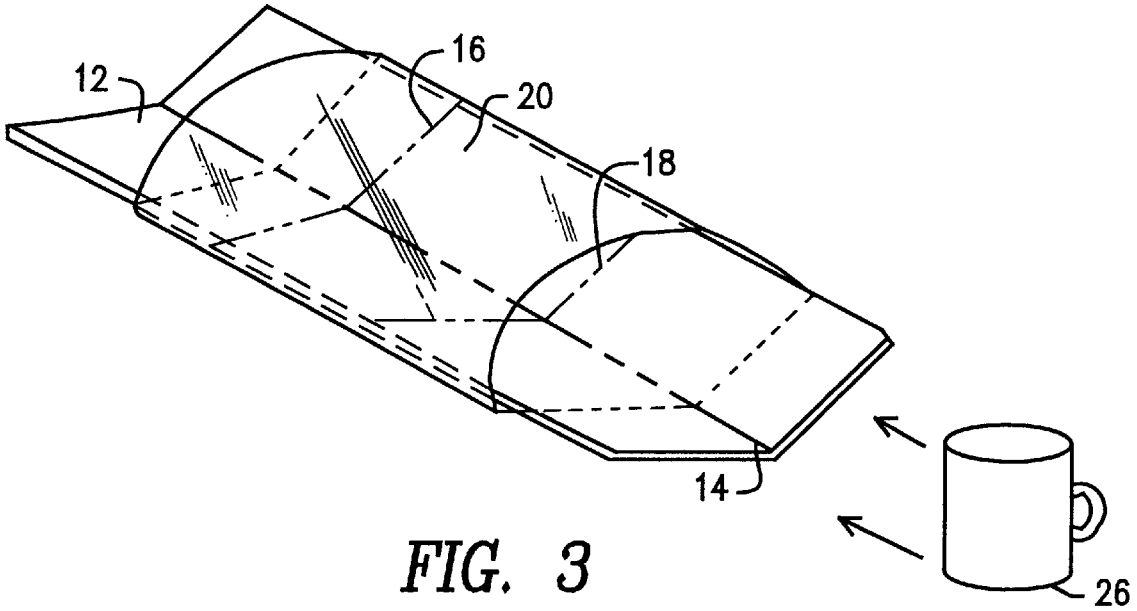
FIG. 3 is an exploded perspective view of the components of FIG. 2 in an article-insertion position with the article to be inserted.

FIG. 3 is an exploded perspective view of the sheet material 12 and the overriding flexible tube or sleeve material 20 in an article-inserting position adapted to receive an article such as a coffee cup 26 as illustrated and shown by the directional arrow to be inserted axially within the bloused-out interior of the sleeve 20, which sleeve 20 is bloused-out due to the folding of the sheet material 12 along the central fold line 14. The amount of the folding angle may vary as desired, but typically would be about 60–90 degrees to permit easy insertion of the article 26 within the flexible tube 20.

Figure 4:
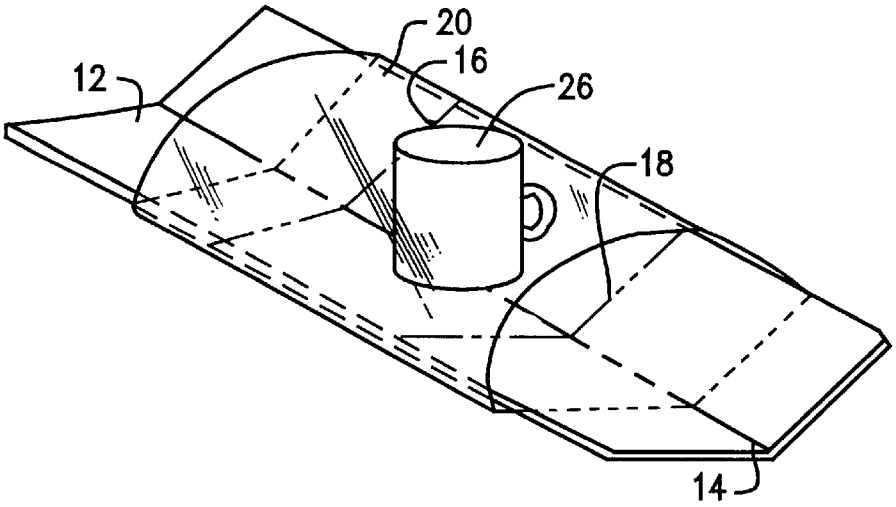
FIG. 4 is a perspective view of the components of FIG. 3 with the article inserted and in position to be immobilized.
Figure 5:
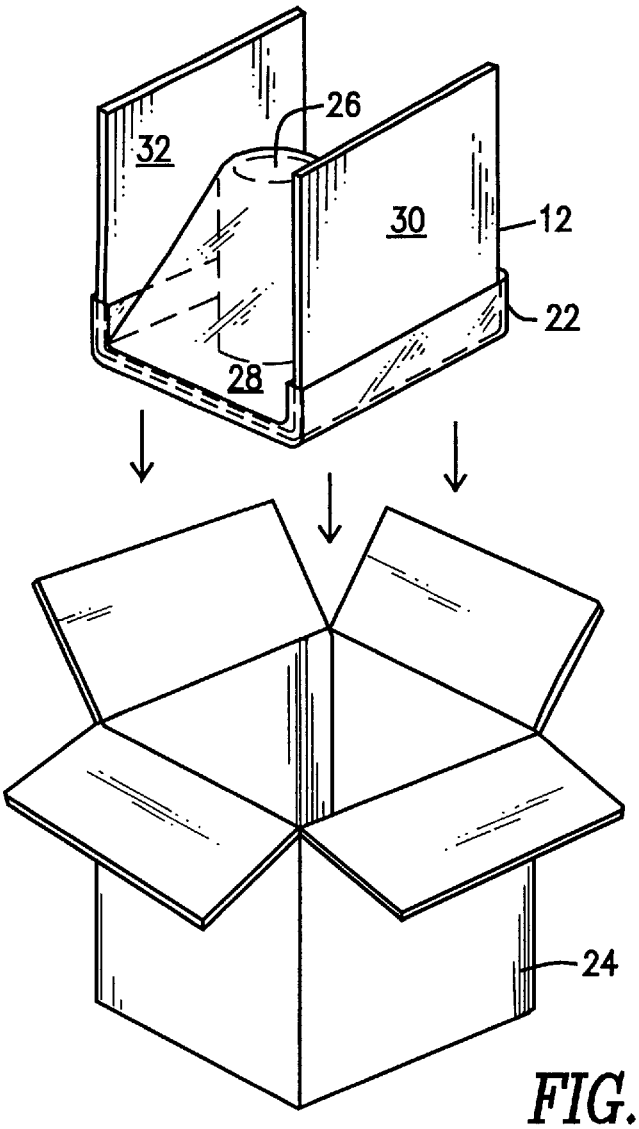
FIG. 5 is an exploded perspective view of a kit of the invention with the components in an article-immobilizing position ready to be inserted in an outer container.

FIG. 4 is the perspective view of the sheet material 12 in an article-insertion position with the flexible tube material 20 about the coffee cup 26, with the sheet material 12 folded on the horizontal score or fold line 14 to allow the tube material 20 to be loosely fitted over the article 26 in preparation to be folded along score lines 16 and 18 to tighten the flexible tube material 20 about the coffee cup 26 in a tight-holding, immobilizing position on the base portion 28. The folding of the sheet material 12 on the horizontal score or fold line 14 allows the flexible tube or sleeve to blouse out to receive the article 26, while the folding upwardly of the end portions 30 and 32 into a generally perpendicular position from the plane of the base portion 26 along the fold lines 16 and 18 causes the sheet material 12 and the horizontal fold lines 14 to flatten out, which in turn causes the tube 20 to stretch tightly over the article 26 positioned on the base portion and to hold the article 26 firmly in position. As illustrated in FIG. 5, the article is in the article-immobilized position on the base sheet 12 with the end portions 30 and 32 bent upwardly 90 degrees from the base 28 along score lines 16 and 18 to tighten the flexible tube material 20 about the article coffee cup 26 in a tight-holding, immobilizing position on the base portion 28, and with the ends of the flexible tube 20 shown as being positioned upwardly on the surface of the lower portion of the end portions 28 and 30, and with the flexible tube 20 stretched about the article 26 to immobilize the article and with the sheet material-immobilized article ready for insertion into a separate closed container.

FIG. 5 is an exploded perspective view illustrating the immobilized article 26 and tube material 20 about sheet material 12 of FIG. 4, about to be inserted within a separate container 24 for packaging and shipping. As desired, additional dunnage or packaging material may be placed on top of the immobilized article 26, or, if desired, additional vertical fold lines to be placed generally parallel to the other fold lines 16 and 18 may be placed on the upper ends of the end portions 30 and 32 so that the upper end portions may be folded over to form an enclosed package and therefore to protect the top of the immobilize article 26.

Figure 6:
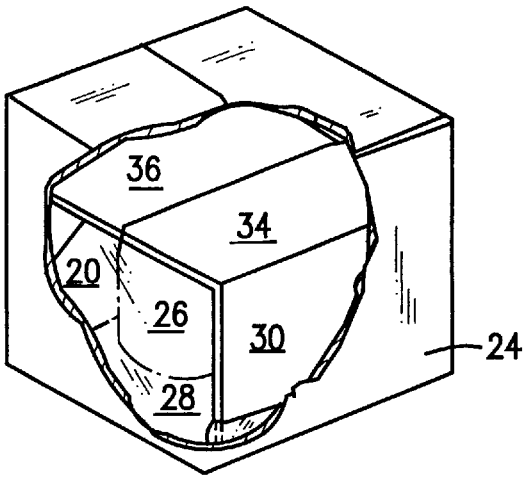
FIG. 6 is a perspective view of another embodiment of the kit components of the invention.

FIG. 6 is a perspective partially sectional view of the immobilized article 26 and the sheet material 12 positioned within the box 24 in another embodiment, wherein the upper end portions of the end portions 30 and 32 have been further folded over to form a top protective cover over the immobilized article 26 along additional vertical fold lines 34 and 36.

Figure 7:
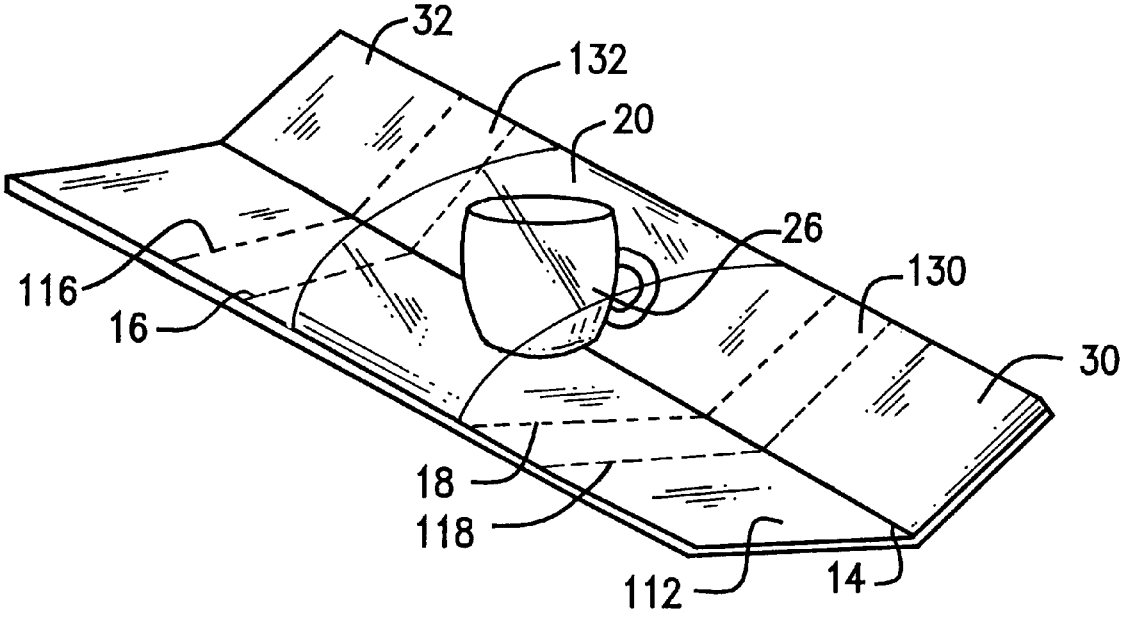
*FIG. 7 is a perspective view of the components of a packaging kit in accordance with another preferred embodiment of the invention with the article inserted in position to be immobilized.*

*FIG. 7 is a perspective view of an alternate embodiment of a sheet material 112 in an article insertion position with the flexible tube material 20 about the article 26, with the sheet material 112 folded on the horizontal fold line 14 to allow tube 20 to fit loosely around article 26. When end portion 30 is folded downwardly alone first vertical fold line 18 and upwardly along second vertical fold line 118, and end portion 32 is folded downwardly along first vertical fold line 16 and upwardly along second vertical fold line 116, the sheet material 112 flattens out, immobilizing article 26. In the immobilized position, sections 130 and 132 extend downwardly below base portion 28, suspending base portion 28 and article 26 from below. End portions 30 and 32 extend upwardly above article 26, protecting article 26 against contact from above. This creates a generally H-shaped structure, further protecting immobilized article 26. Alternatively, end portions 30, 32 may be folded upwardly along fold lines 18, 16 and downwardly along lines 118, 116.*

As described and illustrated, the packaging kit, system and method permits the sheet material 12 and the tube 20 to be stored flat for high density storage and permits for a universal application, since the film tube or sleeve 20 may be stretched over the article being packaged, and one kit could package a variety of items or the kit can be produced in various sizes to cover a wide variety of packaging items. The kit components are environmentally acceptable and sound since they can be made from recycled plastic film material for the tube or sleeve and the sheet material may constitute a stiffened paper or corrugated reusable cardboard. Further, the kit components may be separately removed by placing the kit components in the article article receiving position and recovering the tube 20 and the sheet material 12 while the kit components are easily recyclable since there is no attachment of the flexible film tube 20 to the sheet material 12 except in the outstretched position of the article immobilizing position.

What is claimed is:

1. A packaging kit for the immobilization of an article to be packaged within an outer container, and which kit comprises in combination;

a) a relatively stiff sheet material of defined width and length, having a base portion to hold the article and end portions on opposite sides of the base portion adapted to be folded upwardly at either end of the base portion, the sheet material having a horizontal fold line along its length to permit the sheet material to move between a first, generally flat, non-use position and a second, folded article insertion position and having first and second, spaced-apart, generally parallel vertical fold lines to define and permit the end portions to move between a generally non-use flat position and a folded up position *wherein the sheet material includes a horizontal fold line substantially the length of the sheet material*; and b) a means including film tube dimensioned and adapted to be placed about the exterior sheet material and about the base portion, in a generally loose fit when the sheet material is in the flat position, and to fit snugly about the article on the base portion in the article-immobilization position, whereby the article may be inserted between the base portion and the material of the film tube means, when the sheet material is in the folded article insertion position and when the end portions are folded upwardly and the sheet material is placed in a generally flat position to immobilize the article by the film tube means by hugging the article on the base portion.

2. The kit of claim 1 wherein the sheet material comprises a corrugated cardboard sheet material.

3. The kit of claim 1 wherein the sheet material includes a central horizontal fold line substantially the length of the sheet material.

4. The kit of claim 1 wherein the base and each end portion are generally equal in length.

5. The kit of claim 1 wherein the means including a film tube comprises a flexible, stretchable, plastic film tube.

6. The kit of claim 1 wherein the film tube means has a length which is about the length of the base, portion.

7. The kit of claim 1 wherein the film tube means has a length slightly greater than the length of the base portion, so that each end of the film tube is folded over when the end portions are placed in an upright position.

8. The kit of claim 1 wherein the means including a film tube comprises a flexible, transparent polyethylene film.

9. The kit of claim 1 which includes a container for the insertion of the immobilized article on the sheet material into the container.

10. The kit of claim 1 wherein the fold lines comprises pre-scored lines on a corrugated cardboard sheet material.

11. A method for the immobilization of an article for packaging within an outer container, which method comprises:

a) providing a packaging kit as set forth in claim 1;

b) placing the means including a film tube about the base portion of the sheet material;

c) folding the sheet material on the horizontal fold line to place the sheet material in an article-insertion position and to permit the means including a film tube to blouse outwardly from the base portion of the sheet material;

d) inserting the article to be immobilized between the base portion and the interior of the bloused-out film tube means; and e) folding the end portions of the sheet material upwardly and general perpendicularly on the first and second vertical score lines to place the sheet material in a generally flat position, and to cause the means including a film tube to move against and hug the inserted articles, and thereby to immobilize the article on the base portion of the sheet material.

12. The method of claim 11 wherein the sheet material comprises a relatively stiff, corrugated cardboard sheet material and which includes folding the sheet material into an article insertion position along the generally central horizontal fold line.

13. The method of claim 11 which includes inserting the immobilized article on the base portion, with the end portions in an upright position and placing the sheet material with the immobilized article into a outer container for shipment.

14. The method of claim 11 wherein the means including a film tube comprises a transparent, stretchable, flexible plastic film material and which includes slidably positioning the film tube material over the base portion, with the length of the film tube material extending slightly beyond the first and second vertical fold lines, so that on folding the end portions upwardly, the extending portions of the means including a film tube are placed against a lower portion of the end portions.

15. The article immobilizing package prepared by the method of claim 11.

*16. A method for the immobilization of an article to be packaged within a container, comprising:*

*sliding a film tube over a relatively stiff sheet material having a central base portion and outer end portions on opposite ends of the base portion so that at least the central base portion is encircled by the film tube;*

*folding the sheet material along at least one horizontal fold line substantially the length of the sheet material between a generally flat orientation and an angled orientation so that an article receiving space is formed between the sheet material and the film tube;*

*inserting the article into the article receiving space and placing the article on the base portion;*

*folding at least one of the end portions into an article immobilizing position along at least one vertical fold line between the end portion and the base portion so that the sheet material is returned to the generally flat position relative to the at least one horizontal fold line and the film tube is tightened against the article so that the article is immobilized between the film tube and the base portion; and*

*inserting the immobilized article, sheet material with the at least one end portion in the generally vertical position, and film tube into the container.*

*17. The method of claim 16 wherein the at least one of the end portions is folded into the article immobilizing position by folding the at least one of the end portions into a generally vertical orientation.*

*18. The method of claim 16 wherein each of the end portions are folded into a generally vertical orientation along at least one vertical fold line.*

*19. The method of claim 17 wherein each of the end portions are folded into a generally vertical orientation along at least one vertical fold line.*

*20. The method of claim 16 wherein each of the end portions is folded along two vertical fold lines between the end portions and the base portion so that the central base portion is suspended by the end portions.*

*21. The method of claim 16 wherein the film tube is slid over the central base portion and at least a part of each of the outer end portions of the relatively stiff sheet material.*

*22. The method of claim 17 wherein the end portions are folded upwardly along the second vertical fold line so that the end portions extend above the article, base portion and film tube, thereby protecting the article from contact from above.*

*23. A packaging kit for the immobilization of an article, comprising:*

*a relatively stiff sheet of material of defined width and length, having a base portion adapted to support the article and end portions on opposite sides of the base portion adapted to be folded into an article immobilizing orientation, the sheet material having at least one horizontal fold line along its length, substantially the length of the sheet material, to permit the sheet material to move between a first, generally flat, position and a second, article insertion folded position, and having at least first and second, spaced-apart, generally parallel vertical fold lines to define and permit the end portions to move between a generally flat position and an article immobilizing oriented folded position; and*

*tube means for flexibly encircling at least a part of the base portion of the sheet material in a generally loose fit when the sheet material is in the generally flat position and to fit snugly about the article on the base portion when the end portions are in the article immobilizing oriented folded position;*

*whereby the article may be inserted between the base portion and the tube means when the sheet material is in the second, article insertion folded position and when the end portions are folded to their article immobilizing oriented folded position, the sheet material returns to its generally flat first position relative to the at least one horizontal fold line to immobilize the article by the tube means hugging the article on the base portion.*

*24. The packaging kit of claim 23, wherein the article immobilizing orientation folded position of the end portions is a generally vertical orientation substantially perpendicular to the generally flat first position of the sheet material.*

*25. The packaging kit of claim 24, wherein the relatively stiff sheet of material has first and second pairs of spaced-apart generally parallel vertical fold lines to define and permit the end portions to move between a generally flat position and a vertically oriented folded position.*

*26. The packaging kit of claim 23, wherein the tube means is dimensioned to encircle substantially all of the base portion.*

*27. The packaging kit of claim 23, wherein the tube means is dimensioned to encircle the base portion of the sheet material and some of each of the end portions.*

*28. The packaging kit of claim 23, wherein the relatively stiff sheet of material is formed of corrugated cardboard.*

*29. The packaging kit of claim 23, wherein the tube means includes a flexible, stretchable, plastic film tube.*

*30. The packaging kit of claim 29, wherein the film tube is formed of a transparent poly-ethylene film.*

*31. The packaging kit of claim 23, further including a container adapted to receive the packaging kit when the end portions are in the vertical orientation.*

*32. The packaging kit of claim 23 wherein the horizontal fold line runs down the center of the sheet material.*

*33. The packaging kit of claim 23 wherein the end portions have a width dimension, perpendicular to the length of the sheet material substantially the same as the base portion's width dimension.*

*34. A packaging kit for the immobilization of an article, comprising:*

*a relatively stiff sheet of material of defined width and length, having a base portion adapted to support the article and end portions on opposite sides of the base portion adapted to be folded into an article immobilizing orientation, the sheet material having at least one horizontal fold line along its length substantially the length of the sheet material to permit the sheet material to move between a first, generally flat, position and a second, article insertion folded position, and having at least first and second, spaced-apart, generally parallel vertical fold lines to define and permit the end portions to move between a generally horizontal position and an article immobilizing oriented folded position;*

*tube means for flexibly encircling at least a part of the base portion of the sheet material in a generally loose fit when the sheet material is in the generally flat position without the article being present on the base portion and when the article is on the base portion in the article insertion folded position and in a snug fit about the article on the base portion when the end portions are in the article immobilizing oriented folded position and the base portion is in the flat position; and*

*container means for receiving the immobilized article, sheet material and tube means when the article rests on the base portion of the material sheet, the tube means encircles the at least a part of the base portion and the end portions are in the article immobilizing oriented folded position;*

*whereby the article may be inserted between the base portion and the tube means when the sheet material is in the second, article insertion folded position and the article is immobilized when the end portions are folded to their article immobilizing oriented folded position and the sheet material returns to its generally flat first position relative to the at least one horizontal fold line, by the tube means hugging the article on the base portion, and the immobilized article, tube means and sheet material may be received within the container means.*

*35. The packaging kit of claim 34, wherein the article immobilization orientation is a generally vertical orientation substantially perpendicular to the generally flat first position of the sheet material.*

*36. The packaging kit of claim 35, wherein the relatively stiff sheet of material has at least first and second pairs of spaced-apart generally parallel vertical fold lines to define and permit the end portions to move between a generally flat position and a vertically oriented folded position.*

*37. The packaging kit of claim 34, wherein the tube means is dimensioned to encircle substantially all of the base portion.*

*38. The packaging kit of claim 34, wherein the tube means is dimensioned to encircle the base portion of the sheet material and some of each of the end portions.*

*39. The packaging kit of claim 34, wherein the relatively stiff sheet of material is formed of corrugated cardboard.*

*40. The packaging kit of claim 34, wherein the tube means includes a flexible, stretchable, plastic film tube.*

*41. The packaging kit of claim 40, wherein the film tube is formed of a transparent poly-ethylene film.*

*42. The packaging kit of claim 34, wherein the container means is dimensioned to snugly contain the sheet material when the end portions are in the vertical orientation.*

*43. The packaging kit of claim 34 wherein the horizontal fold line runs down the center of the sheet material.*

*44. The packaging kit of claim 34 wherein the end portions have a width dimension, perpendicular to the length of the sheet material substantially the same as the base portion's width dimension.*

*45. A packaging kit for the immobilization of an article to be packaged within an outer container, and which kit comprises in combination;*

*(a) a relatively stiff sheet material of defined width and length, having a base portion to hold the article and end portions on opposite sides of the base portion adapted to be folded upwardly at either end of the base portion, the sheet material having a horizontal fold line along its length to permit the sheet material to move between a first, generally flat, non-use position and a second, folded article insertion position and having first and second, spaced-apart, generally parallel vertical fold lines to define and permit the end portions to move between a generally non-use flat position and a folded up position; and*

*(b) a means including film tube dimensioned and adapted to be placed about the exterior sheet material and about the base portion, in a generally loose fit when the sheet material is in the flat position, and to fit snugly about the article on the base portion in the article-immobilization position, wherein the film tube means has a length slightly greater than the length of the base portion, so that each end of the film tube is folded over when the end portions are placed in an upright position, whereby the article may be inserted between the base portion and the material of the film tube means, when the sheet material is in the folded article insertion position and when the end portions are folded upwardly and the sheet material is placed in a generally flat position to immobilize the article by the film tube means by hugging the article on the base portion.*

*46. A method for the immobilization of an article to be packaged within a container, comprising:*

*sliding a film tube over a relatively stiff sheet material having a central base portion and outer end portions on opposite ends of the base portion so that at least the central base portion is encircled by the film tube, wherein the film tube is slid over the central base portion and at least a part of each of the outer end portions of the relatively stiff sheet material;*

*folding the sheet material along at least one horizontal fold line so that an article receiving space is formed between the sheet material and the film tube;*

*inserting the article into the article receiving space and placing the article on the base portion;*

*folding at least one of the end portions into an article immobilizing position along at least one vertical fold line between the end portion and the base portion so that the sheet material is returned to the generally flat position relative to the at least one horizontal fold line and the film tube is tightened against the article so that the article is immobilized between the film tube and the base portion; and*

*inserting the immobilized article, sheet material with the at least one end portion in the generally vertical position, and film tube into the container.*

*47. A packaging kit for the immobilization of an article, comprising:*

*a relatively stiff sheet of material of defined width and length, having a base portion adapted to support the article and end portions on opposite sides of the base portion adapted to be folded into an article immobilizing orientation, the sheet material having at least one horizontal fold line along its length to permit the sheet material to move between a first, generally flat, position and a second, article insertion folded position, and having at least first and second, spaced-apart, generally parallel vertical fold lines to define and permit the end portions to move between a generally flat position and an article immobilizing oriented folded position wherein the article immobilizing orientation folded position of the end portions is a generally vertical orientation, wherein the relatively stiff sheet of material has first and second pairs of spaced-apart generally parallel vertical fold lines to define and permit the end portions to move between a generally flat position and a vertically oriented folded position; and*

*tube means for flexibly encircling at least a part of the base portion of the sheet material in a generally loose fit when the sheet material is in the generally flat position and to fit snugly about the article on the base portion when the end portions are in the article immobilizing oriented folded position;*

*whereby the article may be inserted between the base portion and the tube means when the sheet material is in the second, article insertion folded position and when the end portions are folded to their article immobilizing oriented folded position, the sheet material returns to its generally flat first position relative to the at least one horizontal fold line to immobilize the article by the tube means hugging the article on the base portion.*

*48. A packaging kit for the immobilization of an article, comprising:*

*a relatively stiff sheet of material of defined width and length, having a base portion adapted to support the article and end portions on opposite sides of the base portion adapted to be folded into an article immobilizing orientation, the sheet material having at least one horizontal fold line along its length to permit the sheet material to move between a first, generally flat, position and a second, article insertion folded position, and having at least first and second, spaced-apart, generally parallel vertical fold lines to define and permit the end portions to move between a generally flat position and an article immobilizing oriented folded position; and*

*tube means for flexibly encircling at least a part of the base portion of the sheet material in a generally loose fit when the sheet material is in the generally flat position and to fit snugly about the article on the base portion when the end portions are in the article immobilizing oriented folded position, wherein the tube means is dimensioned to encircle the base portion of the sheet material and some of each of the end portions;*

*whereby the article may be inserted between the base portion and the tube means when the sheet material is in the second, article insertion folded position and when the end portions are folded to their article immobilizing oriented folded position, the sheet material returns to its generally flat first position relative to the at least one horizontal fold line to immobilize the article by the tube means hugging the article on the base portion.*

*49. A packaging kit for the immobilization of an article, comprising:*

*a relatively stiff sheet of material of defined width and length, having a base portion adapted to support the article and end portions on opposite sides of the base portion adapted to be folded into an article immobilizing orientation, the sheet material having at least one horizontal fold line along its length to permit the sheet material to move between a first, generally flat, position and a second, article insertion folded position, and having at least first and second, spaced-apart, generally parallel vertical fold lines to define and permit the end portions to move between a generally horizontal position and an article immobilizing oriented folded position, wherein the article immobilizing orientation is a generally vertical orientation, wherein the relatively stiff sheet of material has at least first and second pairs of spaced-apart generally parallel vertical fold lines to define and permit the end portions to move between a generally flat position and a vertically oriented folded position;*

*tube means for flexibly encircling at least a part of the base portion of the sheet material in a generally loose fit when the sheet material is in the generally flat position without the article being present on the base portion and when the article is on the base portion in the article insertion folded position and in a snug fit about the article on the base portion when the end portions are in the article immobilizing oriented folded position and the base portion is in the flat position; and*

*container means for receiving the immobilized article, sheet material and tube means when the article rests on the base portion of the material sheet, the tube means encircles the at least a part of the base portion and the end portions are in the article immobilizing oriented folded position;*

*whereby the article may be inserted between the base portion and the tube means when the sheet material is in the second, article insertion folded position and the article is immobilized when the end portions are folded to their article immobilizing oriented folded position and the sheet material returns to its generally flat first position relative to the at least one horizontal fold line, by the tube means hugging the article on the base portion, and the immobilized article, tube means and sheet material may be received within the container means.*

*50. A packaging kit for the immobilization of an article, comprising:*

*a relatively stiff sheet of material of defined width and length, having a base portion adapted to support the article and end portions on opposite sides of the base portion adapted to be folded into an article immobilizing orientation, the sheet material having at least one horizontal fold line along its length to permit the sheet material to move between a first, generally flat, position and a second, article insertion folded position, and having at least first and second, spaced-apart, generally parallel vertical fold lines to define and permit the end portions to move between a generally horizontal position and an article immobilizing oriented folded position;*

*tube means for flexibly encircling at least a part of the base portion of the sheet material in a generally loose fit when the sheet material is in the generally flat position without the article being present on the base portion and when the article is on the base portion in the article insertion folded position and in a snug fit about the article on the base portion when the end portions are in the article immobilizing oriented folded position and the base portion is in the flat position, wherein the tube means is dimensioned to encircle the base portion of the sheet material and some of each of the end portions; and*

*container means for receiving the immobilized article, sheet material and tube means when the article rests on the base portion of the material sheet, the tube means encircles the at least a part of the base portion and the end portions are in the article immobilizing oriented folded position;*

*whereby the article may be inserted between the base portion and the tube means when the sheet material is in the second, article insertion folded position and the article is immobilized when the end portions are folded to their article immobilizing oriented folded position and the sheet material returns to its generally flat first position relative to the at least one horizontal fold line, by the tube means hugging the article on the base portion, and the immobilized article, tube means and sheet material may be received within the container means.*

*51. A packaging kit for the immobilization of an article, comprising:*

*a relatively stiff sheet of material of defined width and length, having a base portion adapted to support the article and end portions on opposite sides of the base portion adapted to be folded into an article immobilizing orientation, the sheet material having at least one horizontal fold line along its length to permit the sheet material to move between a first, generally flat, position and a second, article insertion folded position, and having at least first and second, spaced-apart, generally parallel vertical fold lines to define and permit the end portions to move between a generally horizontal position and an article immobilizing oriented folded position, wherein the end portions have a width dimension, perpendicular to the length of the sheet material substantially the same as the base portion's width dimension;*

*tube means for flexibly encircling at least a part of the base portion of the sheet material in a generally loose fit when the sheet material is in the generally flat position without the article being present on the base portion and when the article is on the base portion in the article insertion folded position and in a snug fit about the article on the base portion when the end portions are in the article immobilizing oriented folded position and the base portion is in the flat position; and*

*container means for receiving the immobilized article, sheet material and tube means when the article rests on the base portion of the material sheet, the tube means*

*encircles the at least a part of the base portion and the end portions are in the article immobilizing oriented folded position;*

*whereby the article may be inserted between the base portion and the tube means when the sheet material is in the second, article insertion folded position and the article is immobilized when the end portions are folded to their article immobilizing oriented folded position and the sheet material returns to its generally flat first position relative to the at least one horizontal fold line, by the tube means hugging the article on the base portion, and the immobilized article, tube means and sheet material may be received within the container means.*

* * * * *